(12) United States Patent
Brophy (10) Patent No.: US 9,018,404 B2
(45) Date of Patent: Apr. 28, 2015

(54) USING CAVITATION TO INCREASE OIL SEPARATION

(71) Applicant: Sonic Biofuels, LLC, Independence, MN (US)

(72) Inventor: James S. Brophy, Independence, MN (US)

(73) Assignee: Sonic Biofuels, LLC, Independence, MN (US)

( * ) Notice: Subject to any disclaimer, the term of this patent is extended or adjusted under 35 U.S.C. 154(b) by 279 days.

(21) Appl. No.: 13/753,153

(22) Filed: Jan. 29, 2013

(65) Prior Publication Data

US 2013/0204020 A1     Aug. 8, 2013

Related U.S. Application Data

(60) Provisional application No. 61/594,691, filed on Feb. 3, 2012.

(51) Int. Cl.
*C11B 1/00*     (2006.01)
*C11B 1/10*     (2006.01)
*C11B 13/00*    (2006.01)

(52) U.S. Cl.
CPC ............... *C11B 1/106* (2013.01); *Y02E 50/13* (2013.01); *C11B 13/00* (2013.01)

(58) Field of Classification Search
USPC ............................................. 554/8; 422/255
See application file for complete search history.

(56) References Cited

U.S. PATENT DOCUMENTS 7,667,082 B2 *  2/2010  Kozyuk ................. 568/902
8,191,806 B2 *  6/2012  Kreisler et al. ............ 241/1

\* cited by examiner

*Primary Examiner* — Deborah D Carr
(74) *Attorney, Agent, or Firm* — Cook Alex Ltd.

(57) ABSTRACT

Methods and systems are provided that apply cavitation to a grain-based liquid medium processing stream of an oil separation process in order to achieve increased yields. Ultrasonic sources can be used in generating the cavitation. Typically, the oil processing system is a downstream process of an alcohol (such as ethanol) production facility utilizing a dry grind, a modified dry grind or a wet mill alcohol production process.

20 Claims, 8 Drawing Sheets

Figure 2
Dry Mill Alcohol Process with Condensed Syrup Oil recovery

Figure 7

USING CAVITATION TO INCREASE OIL SEPARATION

CROSS REFERENCE TO RELATED APPLICATION

The present application claims the benefit of U.S. Provisional Patent Application Ser. No. 61/594,691, filed Feb. 3, 2012, which is incorporated herein in its entirety.

DESCRIPTION

Technical Field

The present disclosure relates generally to oil production as part of an alcohol processing plant, and, more particularly to processes and systems for oil production using cavitation in one or more locations in an alcohol processing plant.

Background

Oils from plants are used in many processes and products. They include cooking oils, pharmaceuticals, paints, soaps, candles, perfumes, cosmetics, animal feed, and biodiesel as well as many other uses too numerous to name.

Oil extraction has become very important to the renewable fuels industry especially corn ethanol. Historically, corn oil was passed through the process and exited the plant as part of the animal feed. In the past few years processes have been developed to recover this oil creating a new revenue stream for the bio-refinery.

The Federal Government in the United States of America has created new requirements for bio-refineries looking to expand capacity or to produce oil as advanced fuel in the RFS II standard. Plants are to target upwards of 1.4 pounds/bushel by treating all post fermentation streams or target 0.7 pounds/bushel by treating traditional thin stillage streams. Currently plants are able to achieve approximately 0.3 pounds/bushel with existing technology alone. The plants are able to increase oil recovery to 0.5 pounds/bushel by incorporating chemical addition to help break oil emulsions created during the distillation process.

An important advantage of the present method and system is to increase the yield of oil recovered from traditional process streams, providing yield increases that cannot be achieved with current process methods and systems. Commercially significant advances of the present methods and systems are maximized yield and increased revenue for the bio-refinery, providing future growth and security to biofuel producers.

The methods and systems of this disclosure increase oil yield from grain feed stocks, realizing same with lowered energy requirements as well as reduced chemical addition requirements in order to achieve higher oil yields.

SUMMARY

The present disclosure is directed to methods and systems for improving the oil yield from a grain based ethanol production process. The methods and systems involve processing post-fermentation flow streams that include whole stillage, thin stillage, inner effect thin stillage concentrate, concentrated thin stillage syrup prior to a separating system. The methods and systems also involve processing oil and syrup from the separator discharge. The methods and systems involve processing the flow streams with cavitation to free oil from protein and fiber matrices as well as weaken or break the oil-in-water emulsion to increase oil yield during separation.

In one embodiment, the grain based feed stream is comprised of corn, rye, sorghum, wheat, barley, oats, rice, or a combination of two or more of such grain sources.

In one embodiment, the cavitation is generated by ultrasound at a power, a pressure, and an amplitude sufficient to increase oil yield. In one embodiment the cavitation is generated in a hydrodynamic reactor at a velocity, pressure and temperature sufficient to create hydrodynamic cavitation and increase oil yield.

Although the systems and methods described herein focus primarily on oil recovery primarily from a corn ethanol processing plant, it should be noted that any of the systems and methods described can be used in any alcohol processing facility with any type of grain feed stock.

DETAILED DESCRIPTION OF THE ILLUSTRATED EMBODIMENTS

The embodiments disclosed herein are exemplary only, and the subject matter described herein may be embodied in various forms and various combinations. Therefore, specific details described herein are not to be interpreted as limiting the subject matter as defined in the accompanying claims.

The present process and system are directed to the unexpected discovery that the use of cavitation can be utilized to increase the removal of oil from a grain-based liquid medium. With the process and system, oil yield is improved by at least about 1 percent and by at least 20 percent or above such as up to about 25 percent.

The standard use of cavitation in a liquid processing stream is to create an emulsion which, in typical oil removal processes, usually results in a reduced yield of extracted oil.

When grain-based liquid mediums are processed in a centrifuge or decanter, in either the vertical or horizontal orientation, the liquid medium is separated into a light phase and heavy phase. The light phase usually consists of the separated oil while the heavy phase consists of the solids, water and emulsion layer.

In grain-based liquid processing streams there is free oil which will readily come out of solution and is easily removed with a decanter or centrifuge. The difficult oil to extract is bound in the protein and fiber of the grain-based liquid stream or bound with water and protein in an emulsion usually created during the distillation step in the beer column or primary column. To increase oil yield, the oil must be freed from the emulsion layer as well as the protein and fiber matrix. In a typical processing plant the use of de-emulsifier or emulsifiers which act in an atypical way by freeing rather than emulsifying oil are used to increase the amount of free oil available for removal in the centrifuge.

It was unexpectedly discovered that when applying cavitation to the grain-based liquid medium the amount of free oil increased rather than being bound in an emulsion which would typically be expected. It was also found that when cavitation was applied to a grain-based liquid media that also contained de-emulsifying chemicals or emulsifiers, the free oil also increased over the use of only a chemical treatment. It was further discovered that the use of cavitation could be used to reduce the amount of chemical additive required to free the same amount or more oil than the use of chemical alone. This discovery is very important since the cost of chemical addition is very high.

While not intending to bound by theory, it is believed that the applied cavitation breaks the weak oil and water emulsion and breaks or fractures the protein and fiber matrix allowing the entrapped oil to release with the cavitational wave. As discovered and represented in the present Examples and Figures, the amplitude, wavelength, and intensity of the cavitational wave is important to the improved oil removal.

Cavitation is created by the compression and expansion zones of the wave. The power is generated at a source and transmitted through the media by a wave. The wave is made up of compression and expansion areas in one complete cycle. As the compression and expansion cycles pull and compress the liquid medium, bubbles are formed and imploded creating large releases of energy. The greater the amplitude of the wave the more energy is released in the collapse of the cavitation bubbles and the more intensity the wave will transmit into the processed media stream. The more intense the wave transfer the more likely the oil and water will form an emulsion.

As the test data show, it was found that as amplitude reduced from 13.33 microns to 8.33 microns, the amount of oil removal increased significantly especially when de-emulsifier or chemical was added to the grain based liquid medium stream. As amplitude remained constant and power and pressure increased, the amount of removed oil was reduced. It was also found as you went below 6 micrometers of amplitude, the amount of energy applied to the system was not sufficient to significantly impact oil separation.

Figure 8:
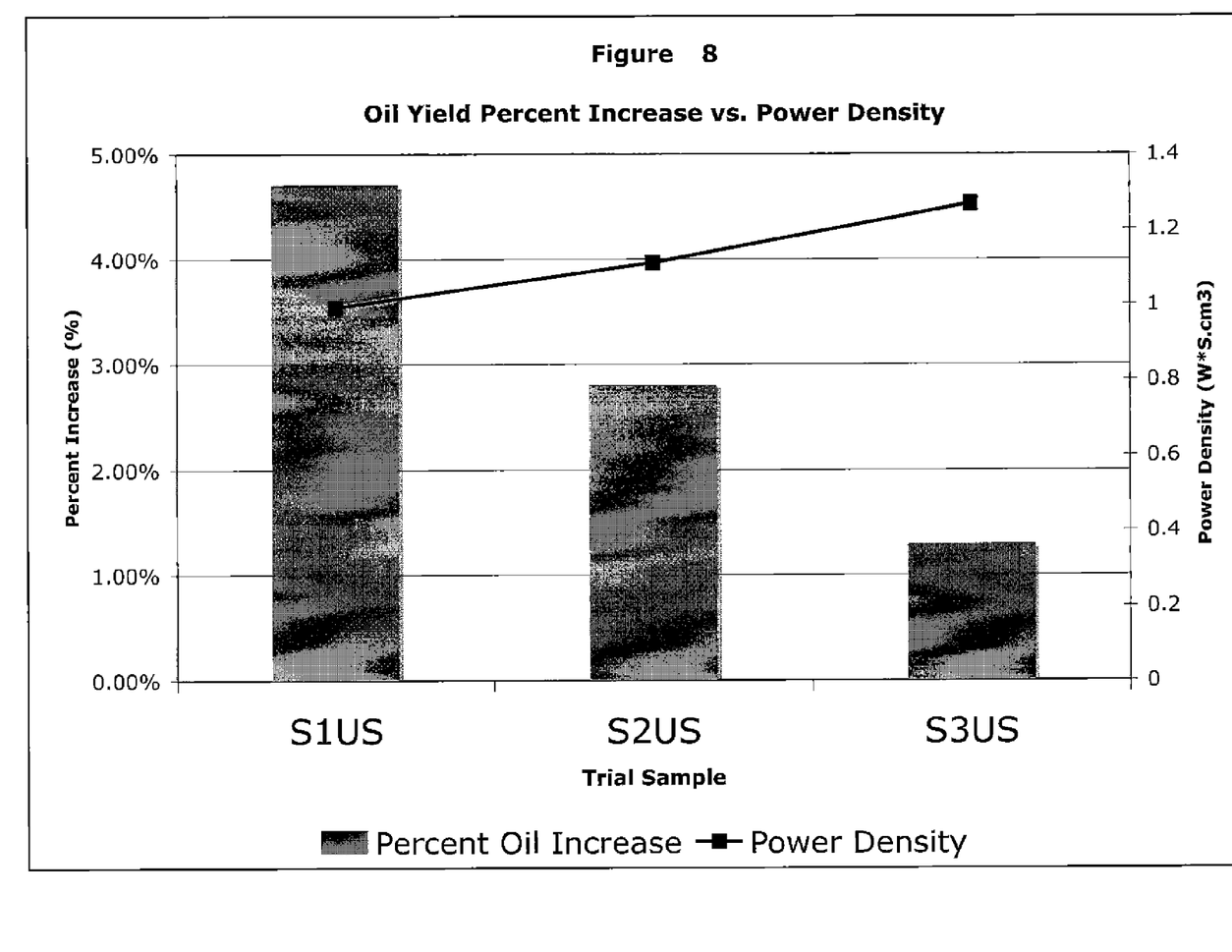
FIG. 8 is a chart representing percentage oil increased with varying power density across all data points, both with the inclusion of chemical and without chemical additive.

The data also show that as amplitude varies the efficiency of oil removal is dependent on the amount of power put into the grained based liquid media. This is reflected in the power density or $W*S/cm^3$. FIG. 8 shows that as amplitude is held constant, oil separation increases as power and intensity are reduced. The data show oil increases across a range of 0.8 $W*S/cm^3$ to 3.0 $W*S/cm^3$.

The highest oil yields were found at a power density of 0.95 $W*S \cdot cm^3$ to 1.3 $W*S/cm^3$. It is believed that the work performed by the wave is sufficient to disrupt the protein fiber matrix but not sufficient to make a strong emulsion. This results in freeing more oil for extraction but does provide a strong emulsion which would inhibit the oil from passing over in the light phase off the separator. It will be understood by those of skill in the art that the energy input will be dependent on the amplitude of the cavitation wave being used and the solids content and temperature of the medium being treated.

As described below, the present cavitational process can be applied at several locations. Several of these locations are illustrated in the accompanying Figures.

Figure 1:
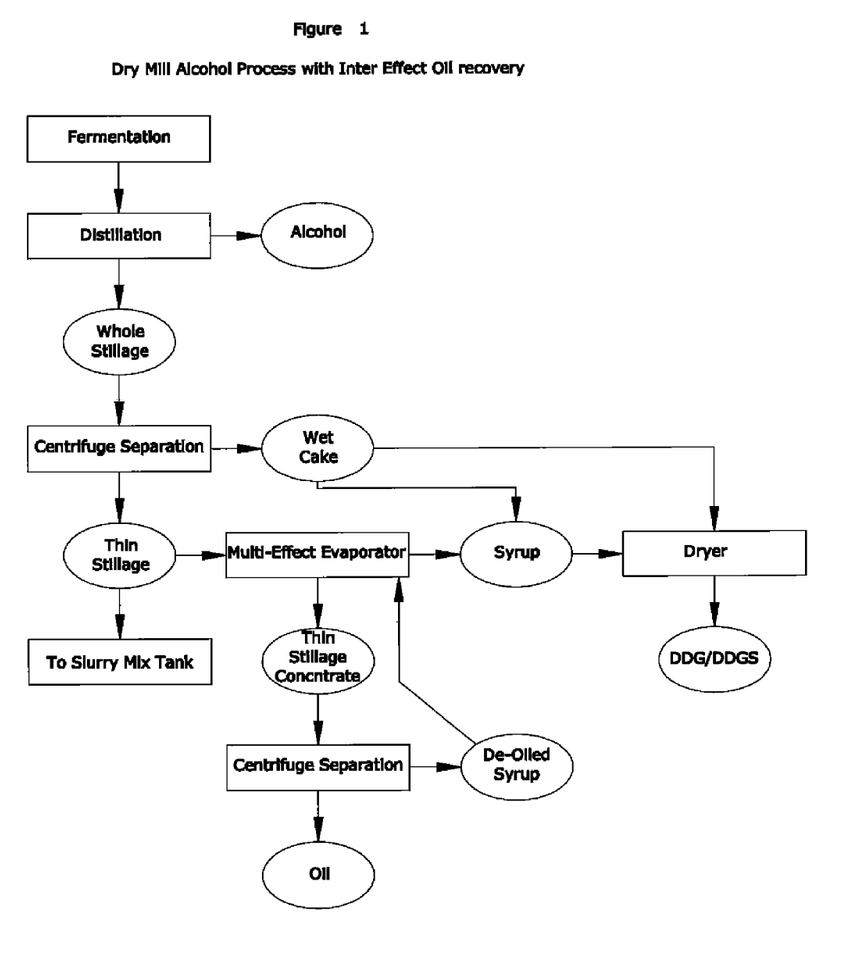
FIG. 1 is a process flow diagram of the back end of an alcohol production process where thin stillage concentrate is removed inter-effect from the multi-effect evaporator and processed through the centrifuge separating the free oil from the stillage concentrate before it is returned to the evaporator.
Figure 2:
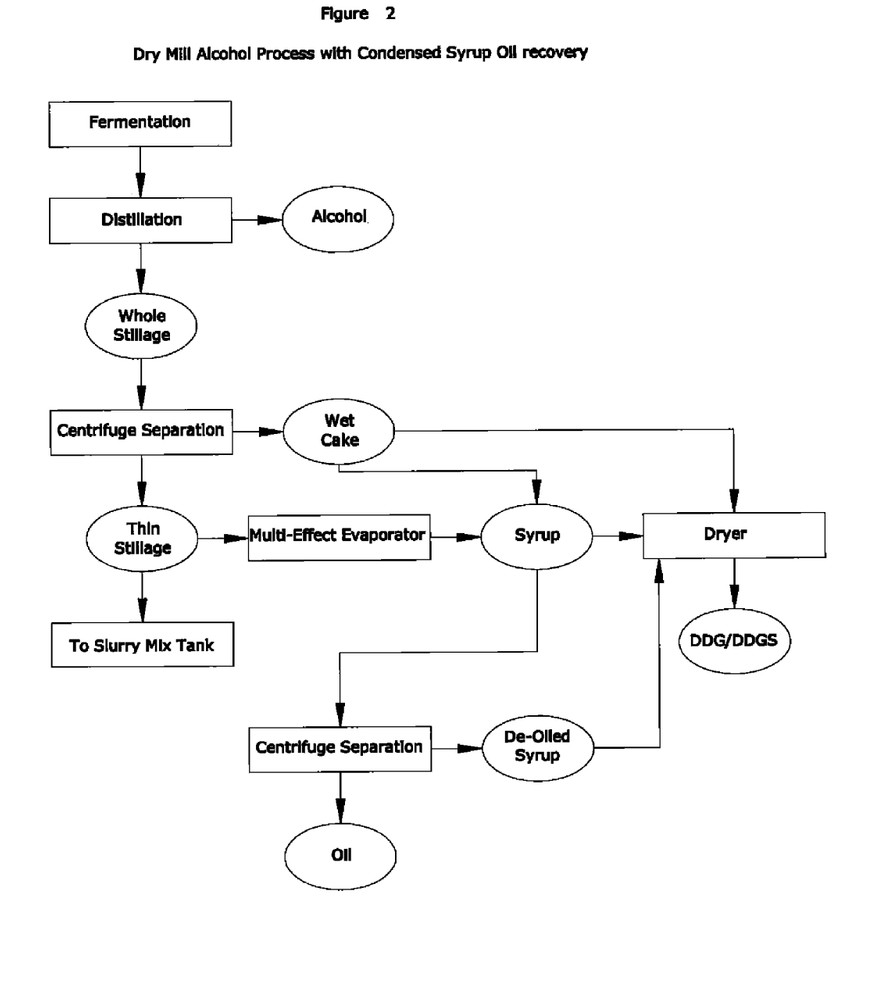
FIG. 2 is a process flow diagram of the back end of an alcohol production process where concentrated syrup from the end of the evaporator is processed through the centrifuge separating the free oil from the syrup before it is processed further into distillers dried grain (DDG) or distillers dried grains (DDGS) animal feed.

FIG. 1 and FIG. 2 show an alcohol production process and system such as that is used in a starch-to-ethanol process. Although the feed material in this example is corn and the oil produced is corn oil, any grain may be used as a feed source and its oil can be separated. The schematic shows the process from fermentation tank to distillation where alcohol is separated from the beer feed. The product off the bottom of the beer column is called whole stillage. The whole stillage is processed through a horizontal separator splitting the feed into solids or wet cake and liquid or thin stillage. The thin stillage stream is split with part of the stream returning to the front end of the plant as slurry water while the other part is sent to the multi-effect syrup evaporator. The oil in the thin stillage stream is typically removed in one of two places in the process, which are at or near the required temperature range for separation.

In FIG. 1, the inter-effect stillage concentrate stream is taken off one of the effects and processed through the oil separation centrifuge. In FIG. 2, the syrup concentrate off the end of the evaporator is sent to the oil separation centrifuge. The centrifuge may be a vertical disc stack type centrifuge or it may be configured in the horizontal.

In the case of FIG. 1 the inter-effect concentrate is separated into an oil stream and a reduced oil concentrate stream. The reduced oil concentrate stream is returned to the evaporator for concentration into syrup. In the case of FIG. 2 the syrup concentrate is separated into an oil stream and a reduced oil syrup concentrate. The reduced oil concentrate is mixed with the wet cake from earlier in the process and dried into DDGS. In either case the oil from the centrifuge separator is pumped to oil settling tanks where it is collected for load out.

Figure 3:
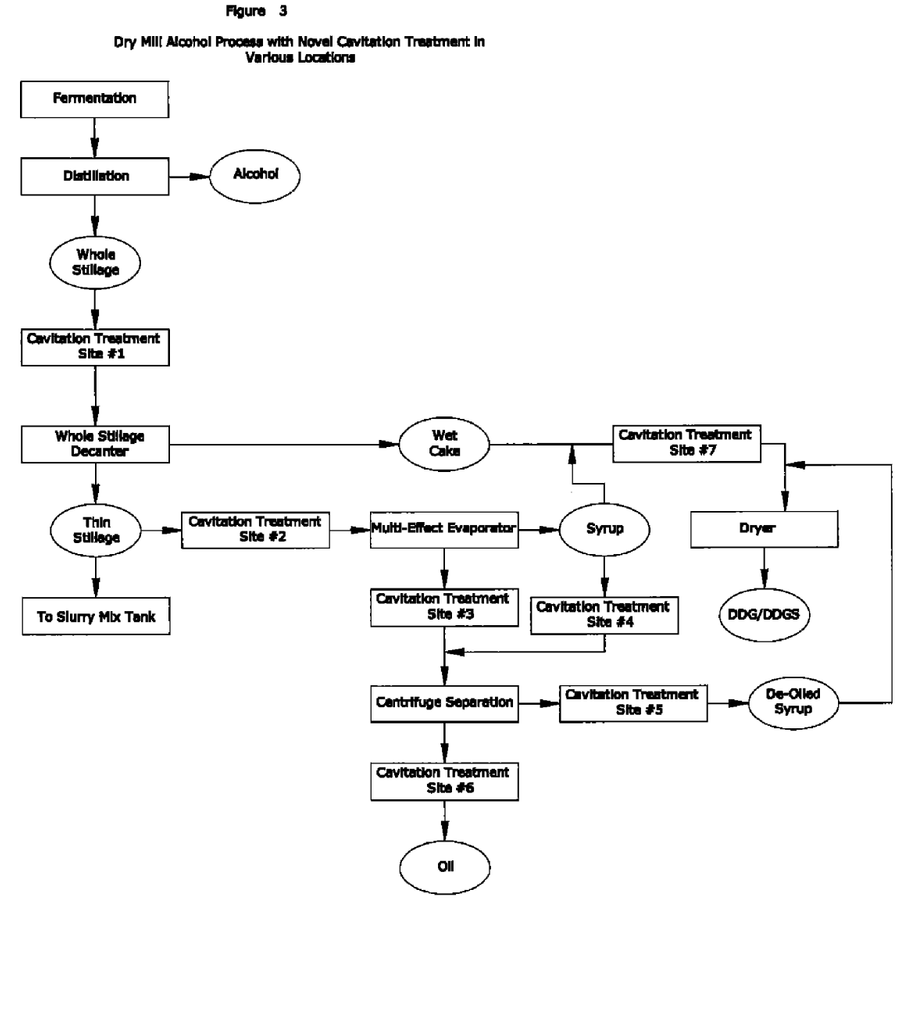
FIG. 3 is a process flow diagram of the back end of an alcohol production process. Cavitation Sites 1 through 7 represent process points where the novel cavitation process can be applied.

FIG. 3 shows an alcohol production process and system similar to those of FIG. 1 and FIG. 2 which includes the novel method and system for producing increased oil yields by including one or more cavitation steps and sites in various locations depicted by FIG. 3. Cavitation Site #1 is applied preferably prior to the whole stillage separator at a power and intensity sufficient to free the bound oil from the protein and fiber matrices as well as the oil and water emulsion. By processing the whole stillage stream more oil will be included in the thin stillage stream which would result in more available oil for removal in the down stream oil separator. Cavitation Site #2 can be applied in addition or alternatively to Cavitation Site#1 after the thin stillage stream is split and prior to being fed into the evaporator. Additionally or alternatively, a third location at Cavitation Site #3 may be applied on the inter-effect thin stillage concentrate stream prior to the oil separator. Additionally or alternatively, a Cavitation Site #4 may be applied on the syrup concentrate stream prior to the oil separator. Additionally or alternatively, Cavitation Site #5 is on the de-oiled syrup stream after the oil separator. Additionally or alternatively, a Cavitation Site #6 is on the corn oil stream after the oil separator. Additionally or alternatively, Cavitation Site #7 is on the wet cake and syrup stream prior to the DDGs dryer.

Cavitation equipment that is suitable for carrying out the process include Hielscher Model 1000 HD Ultrasound Generator and Transducer with a 34 mm block sonotrode and a 1.8× and a 2.2× reducer. Such a reducer can reduce the amplitude of the system from 24 microns (micrometers) to 1.33 microns and to 10.91 microns, respectively. Other cavitation products are as follows: Emerson (Branson Ultrasound, Shock Wave Power Reactor by Hydrodynamic, and CFC (Controlled Flow Cavitation) by Arisdyne.

The application of the novel method and system will free oil bound in the protein and fiber matrices as well as aid in the weakening or breaking of the oil water emulsion. Determining the most beneficial location or locations for the novel cavitation process and sites in and around the evaporator and prior to the oil separator is somewhat a function of the starch source, both the type of starch source and its quality and chemical and physical properties. Variations in natural sources of raw material and variations in sources and environmental conditions during growing, starch processing prior to entering the present method and system will affect the present method and system. Thus, it is expected that variations are to be encountered and testing of processing variables will be practiced for optimization of the process and system, including setting parameters of equipment and method steps. Certain specifics in this regard are evident from the following Examples. Also, Cavitation Sites #5, #6 and #7 may additionally or alternatively be applied post oil separation to aid in oil separator efficiency as well as to improve oil clarity.

The present system and method for oil production applies cavitation to a grain-based liquid medium processing stream in one or more locations of an oil separation process at a power and frequency effective to increase oil yield and reduce the residual oil levels in the processed stream when applied prior to, immediately after or both prior to and immediately after the oil separator. Typically, the grain in the grain-based liquid medium processing stream is selected from corn, rye, sorghum, wheat, barley, oats, rice, or a combination thereof. For example, the grain-based liquid medium processing stream is whole stillage, thin stillage, inner evaporator effect thin stillage concentrate, concentrated thin stillage syrups, oil from separator, syrup discharge from separator and the mixture of wetcake, or syrup prior to the DDGs dryer.

The oil processing system is a downstream process of an alcohol production facility utilizing a dry grind, a modified dry grind or a wet mill alcohol production process. In an especially useful embodiment, the alcohol production facility produces ethanol.

In a useful embodiment, the cavitation is created through the use of at least one high-powered ultrasound transducer operating at a frequency of about 10 to about 30 kHz, optionally at least about 15 kHz. At least one said high-powered ultrasound transducer can generate between about 100 Watts and about 20,000 kW of power, optionally between about 500 Watts and about 4 kW of power and/or works at an amplitude of between about 1 and about 150 micrometers, optionally between about 5 and about 24 micrometers, or optionally between about 5 and about 15 micrometers.

When desired, a plurality of said high-powered ultrasound units can be used. Multiple units can be configured in series or in parallel, for example. Also, at least one of the high-powered ultrasound units can be configured with its own flow cell, or the ultrasound unit and flow cell can be incorporated together in a single length of pipe.

It will be appreciated from details herein that the cavitation is generated by flowing the grain based liquid media through at least one hydrodynamic system reactor unit at a processing pressure suitable for creating a hydrodynamic cavitation zone in the reactor. For example, the differential processing pressure can be in the range of about 15 psi to about 150 psi. In addition, the power density applied to the grain-based liquid medium processing stream typically broadly is in the range of between about 0.8 W*s/cm$^3$ and about 3 W*s/cm$^3$, such as between about 0.9 W*s/cm$^3$ and about 1.5 W*s/cm$^3$, or between about 0.95 W*s/cm$^3$ and about 1.3 W*s/cm$^3$.

Processing the grain-based liquid medium subjected to cavitation can be accomplished through a horizontal centrifuge, a disc stack centrifuge, a filter press, or combinations thereof, for example. Generally, the temperature of the grain based liquid media is maintained between about 60° F. and about 250° F., typically between about 120° F. and about 212° F., or most typically between about 180° F. and about 212° F.

EXAMPLE 1

In one embodiment, the novel methods and systems were trialed at Cavitation site #4, using a corn-originating source. The cavitation method used was high powered ultrasound (HPU). The particular unit was a Hielscher Model 1000 HD Ultrasound Generator and Transducer, with a 3 mm block sonotrode and a 1.8× and 2.2× reducer, which reduced the amplitude of the system from 24 microns to 1133 microns and 10.91 microns, respectively. This sonotrode was placed in a flow cell for continuous processing under pressure.

Figure 4:
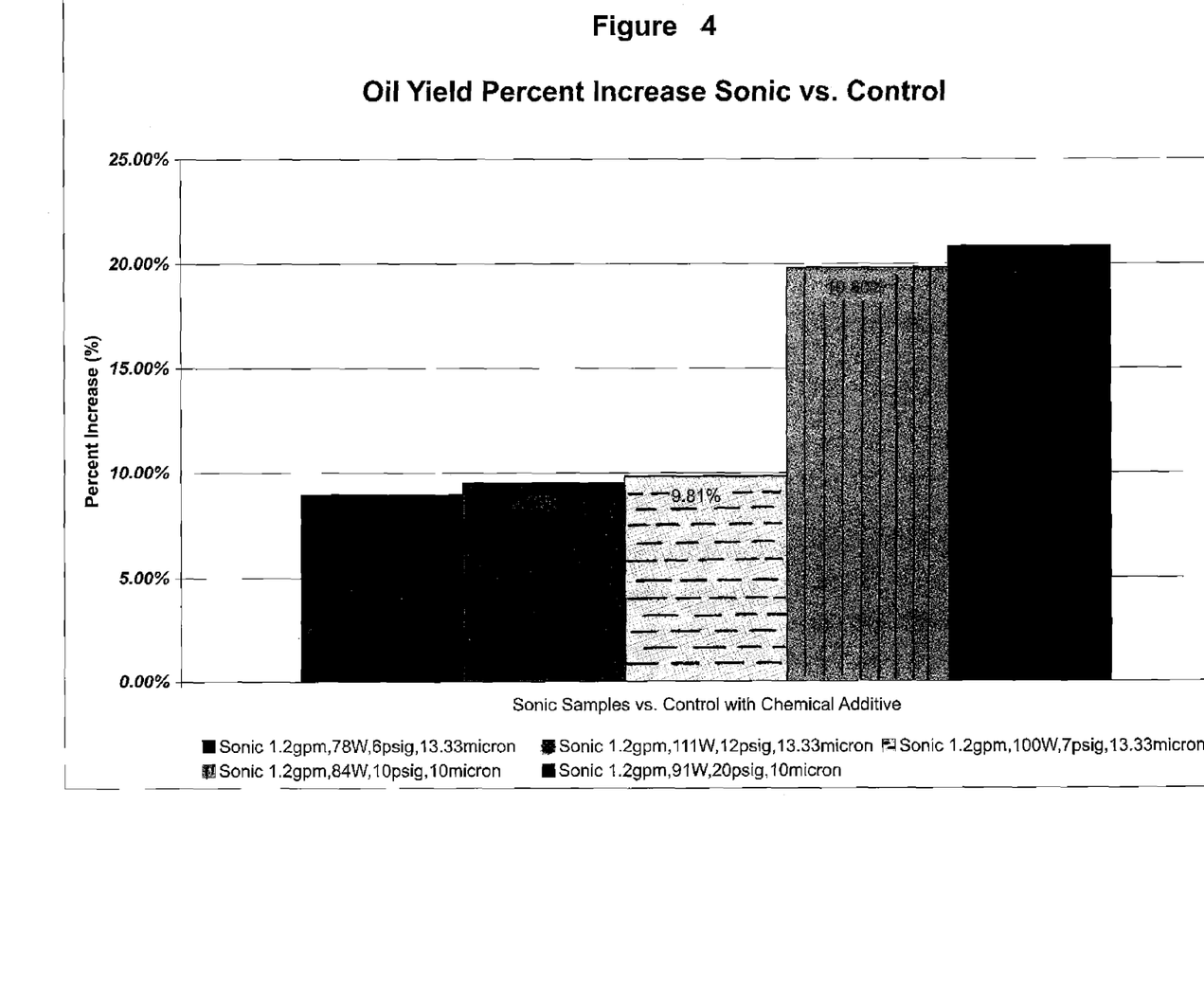
FIG. 4 is a chart representing percentage oil yield increases versus control with varying process setpoints with the addition of chemical additive.

The process feed stream was 40% Total Solids Syrup off the end of the evaporator. The temperature of the syrup was 180° F. The syrup was treated at varying process parameters as depicted in FIG. 4. The feed stream flow rate was 1.2 gpm, and samples were taken at various set points. Sample #1 (left-most graph bar) was treated with HPU at 78 Watts, 6 psig pressure, and 13.33 microns of amplitude. Sample #2 was treated with HPU at 111 Watts, 12 psig pressure, and 13.33 microns of amplitude. Sample #3 was treated with HPU at 100 Watts, 7 psig pressure, and 13.33 microns of amplitude. Sample #4 was treated with HPU at 84 Watts, 10 psig pressure, and 10 microns amplitude, and Sample #5 (right-most graph bar) was treated with HPU at 91 Watts, 20 psig pressure and 10 microns amplitude.

All samples contained a de-emulsifier chemical additive which was a first proprietary chemical additive, being a de-emulsifier to aid in the break-up of the oil-water emulsion, added at the 500 ppm level. The results, as can be seen by the chart in FIG. 4, show that as flow and amplitude were held constant at 1.2 gpm and 13.33 microns respectively and power and pressure varied, the resulting increase of 8.91%, 9.46%, and 9.81% for samples 1, 2 and 3 respectively over the control were consistent. As seen with samples 4 and 5, the flow and amplitude were held constant at 1.2 gpm and 10 microns respectively and the pressure and power varied, the resulting increase of 19.8% and 20.8% for samples 4 and 5 respectively over the control were consistent. This trial showed that amplitude or intensity of the HPU was a major factor in oil yield. It was observed that as amplitude, power, and intensity increased, the oil water emulsion tended to increase or strengthen reducing the amount of free oil collected off the centrifuge.

EXAMPLE 2

Figure 5:
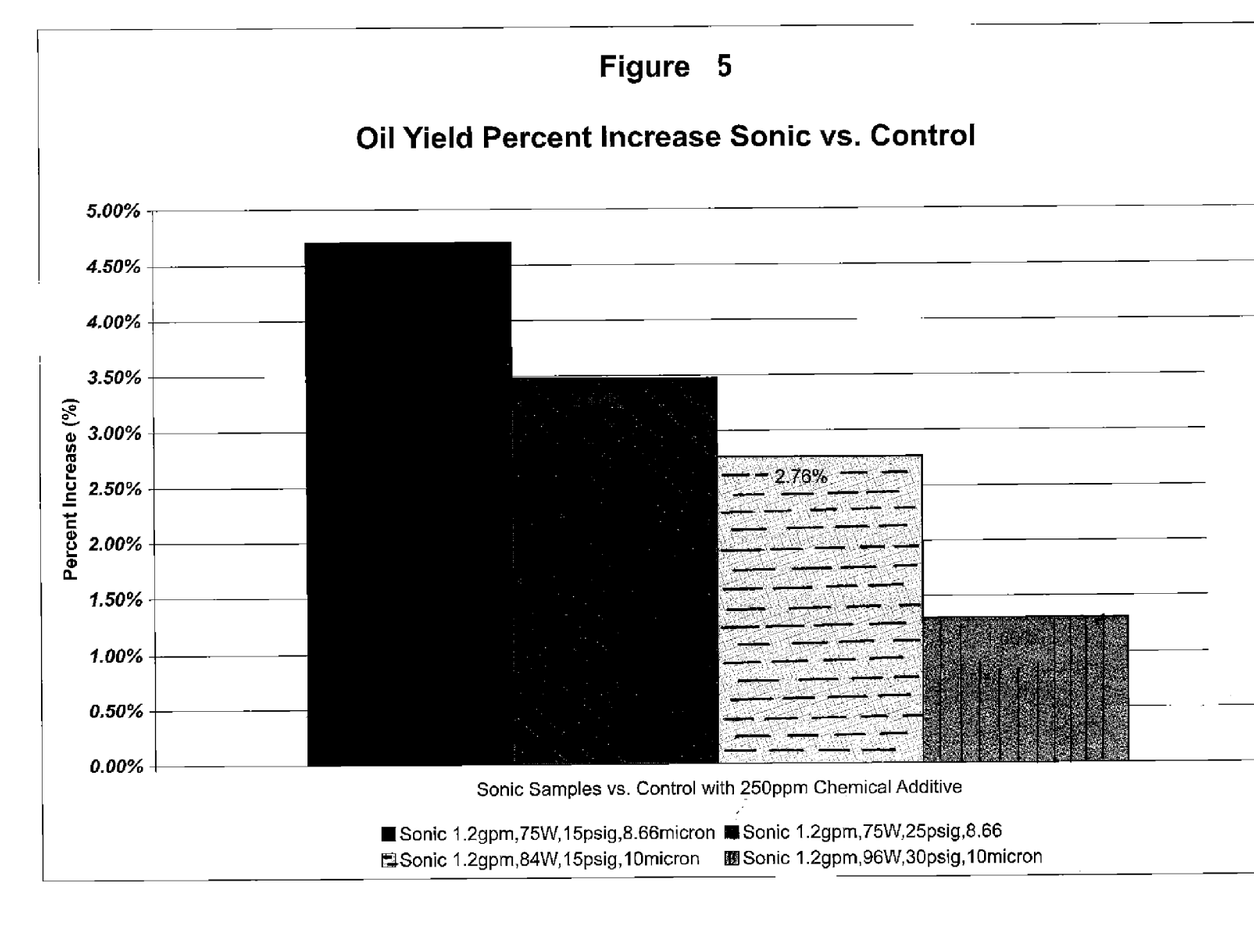
FIG. 5 is a chart representing percentage oil yield increases versus control with varying process setpoints with the addition of half the "chemical A" additive.

In another embodiment, the novel methods and systems were trialed at Cavitation Site #4. The cavitation method used was HPU. The process feed stream was 40% Total Solids Syrup off the end of the evaporator. The temperature of the syrup was 180° F. The syrup was treated with half (250 ppm) of an alternative chemical additive, which was a second proprietary composition including a non-ionic surfactant as its base component. The syrup was treated at varying process parameters as depicted in FIG. 5. The feed stream was held constant at 1.2 gpm and samples were taken at various setpoints. Sample #1 (left-most graph bar) was treated with HPU at 75 Watts, 15 psig pressure, and 8.66 microns amplitude. Sample #2 was treated with 75 Watts, 25 psig pressure, and 8.66 microns amplitude. Sample #3 was treated with 84 Watts, 15 psig pressure, and 10 microns amplitude. Sample #4 was treated with 96 Watts 30 psig pressure, 10 microns amplitude.

FIG. 5 shows that as intensity and pressure increase and the amount of chemical additive decreases the emulsion is more sensitive to pressure, amplitude and intensity changes. Sample #1 (left-most graph bar) and Sample #2 show as pressure increased and intensity remained constant, the oil yield increase dropped from 4.7% to 3.47% over the control. Samples #3 and #4 also show that as intensity was increased from 8.66 microns to 10 microns and pressure was increased from 15 psig to 30 psig, the oil yield increase reduced from 2.76% to 1.3%.

FIG. 8 shows that as Power Density increases the amount of oil recovery decreases. Percent oil increase is represented by the bar chart and the power density is represented by the line graph. The power density ranged from 0.99 W*s/cm3 to 1.27 W*s/cm3 and the associated oil percent increase ranged from 4.7% to 1.3%.

EXAMPLE 3

Figure 6:
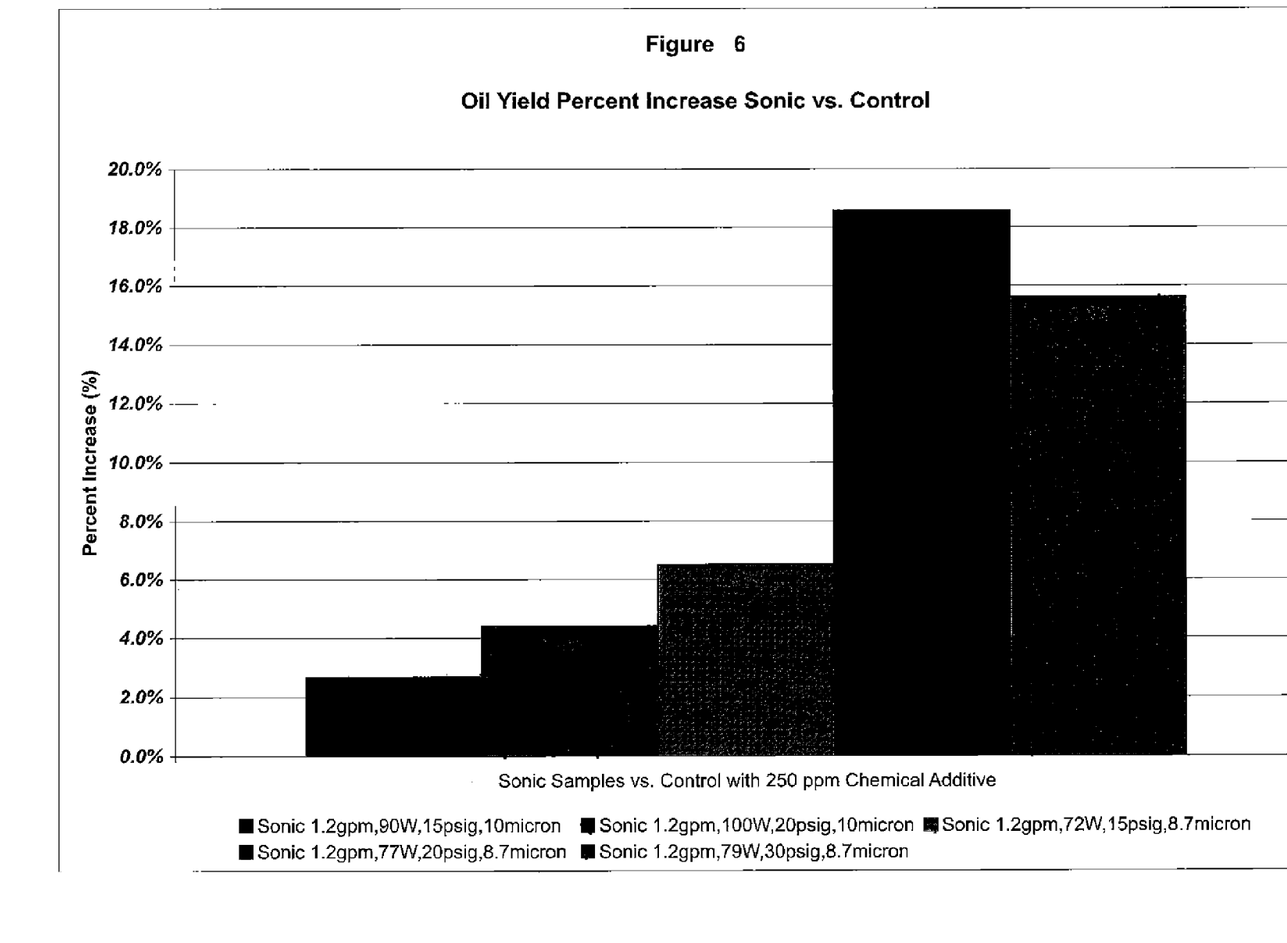
FIG. 6 is a chart representing percentage oil yield increases versus control with varying process setpoints with the addition of half the "chemical B" additive.

In a further embodiment, the novel method and system was trialed at Cavitation Site #4. The cavitation method used was HPU. The process feed stream was 40% Total Solids Syrup off the end of the evaporator. The temperature of the syrup was 180° F. The syrup was treated with 250 ppm of the de-emulsifier chemical of Example 1. The syrup was treated at varying process parameters as depicted in FIG. 6. The feed stream was held constant at 1.2 gpm and samples were taken at various setpoints. Sample #1 (left-most graph bar) was treated with HPU at 90 Watts, 15 psig pressure, and 10 microns amplitude; Sample #2 was treated with 100 Watts, 20 psig pressure, and 10 micron amplitude; Sample #3 was treated with 72 Watts 15 psig pressure, 8.7 microns amplitude; Sample #4 was treated with 77 Watts, 20 psig pressure, and 8.7 microns amplitude; and Sample #5 (right-most graph bar) was treated with 79 Watts, 30 psig pressure, and 8.7 microns amplitude.

FIG. 6 shows that in Samples #1 and #2 as Flow and Amplitude were held constant and pressure and power were increased, the oil yield increased from 2.7% to 4.4%, respectively. Samples #3 through #5 show that as flow and amplitude were held constant and pressure and power were increased, the oil yield changed from 6.5%, 18.6%, and 15.6%, respectively. This trial confirmed that the use of the novel cavitation process and system increased the oil yield versus control as well as showed that yield could be increased as chemical additive is reduced. The chemical additive used in this trial was more responsive to higher pressure than the chemical additive used in the prior example.

EXAMPLE 4

Figure 7:
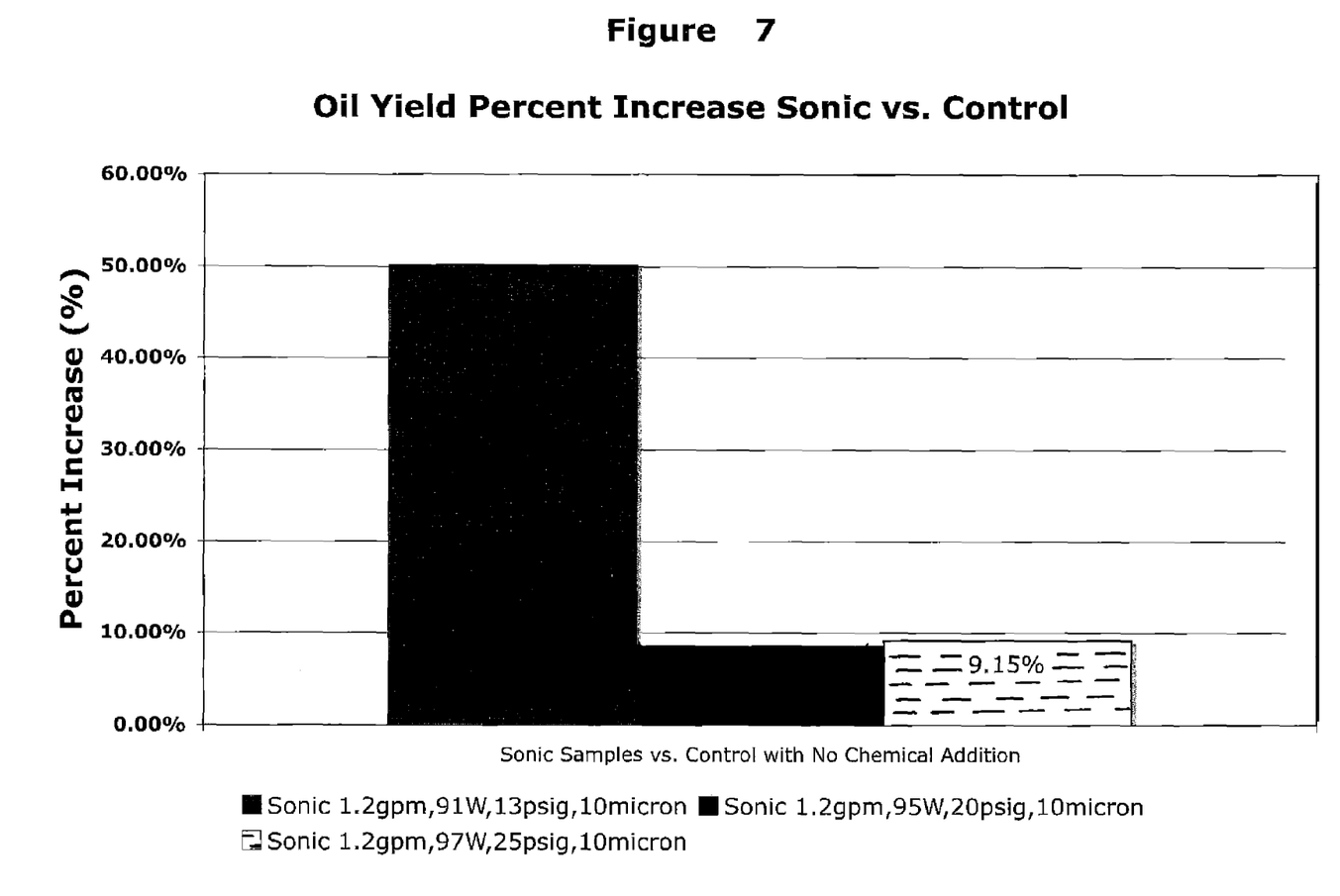
FIG. 7 is a chart representing percentage oil yield increases versus control with varying process setpoints without addition of any chemical additive.

In an additional embodiment, the novel methods and systems were trialed at Cavitation Site #4. The cavitation method used was HPU. The process feed stream was 40% Total Solids Syrup off the end of the evaporator. The temperature of the syrup was 180° F. The syrup was not treated with any chemical additive. The syrup was treated at varying process parameters as depicted in FIG. 7. The feed stream was held constant at 1.2 gpm and samples were taken at various setpoints. Sample #1 was treated with HPU at 91 Watts, 13 psig pressure, and 10 microns amplitude; Sample #2 (middle graph bar) was treated with 95 Watts, 20 psig pressure, and 10 microns amplitude; and Sample #3 was treated with 97 Watts, 25 psig pressure, and 10 microns amplitude. FIG. 7 shows that the novel method and system significantly increased oil yield at the various setpoints over the control. It also showed that when no chemical additive was used the flow stream was more sensitive to increased pressure.

As seen with the above embodiments, the use of the novel method and system improved the yield of oil in all four trials with oil yield increasing from approximately 2% to 20%. It will be appreciated that variations exist concerning the most effective setpoints based on whether or a chemical additive is used, concerning the Site where the novel methods and systems are applied, and concerning the solids makeup of the feed stream.

Application of cavitation to one or more of the various back end processing streams of a grain based alcohol processes and systems according to this disclosure has shown to be effective at increasing oil yield with and without the addition of chemicals. The cavitation system can be implemented in an existing facility with minor process modification and limited space requirements. In one embodiment the oil yield was shown to increase through use of these novel methods and systems from 2% to 20% and chemical addition was shown to be reduced by 35%.

Although specific embodiments have been outlined herein, it will be appreciated by those skilled in the art that any arrangement to achieve the same purpose may be substituted for the specific embodiment shown. It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A method for oil production comprising: applying cavitation to a grain-based liquid medium processing stream in one or more locations of an oil separation process at a power and frequency effective to increase oil yield and reduce the residual oil levels in the processed stream when applied prior to, immediately after or both prior to and immediately after the oil separator.

2. The method of claim 1, wherein the grain in the grain-based liquid medium processing stream is selected from corn, rye, sorghum, wheat, barley, oats, rice, or a combination thereof.

3. The method of claim 1, wherein the grain-based liquid medium processing stream is selected from the group consisting of whole stillage, thin stillage, inner evaporator effect thin stillage concentrate, concentrated thin stillage syrups, oil from separator, syrup discharge from separator and the mixture of wetcake and syrup prior to the DDGs dryer.

4. The method of claim 1, wherein the oil processing system is a downstream process of an ethyl alcohol production facility utilizing a dry grind, a modified dry grind or a wet mill alcohol production process.

5. The method of claim 3, further including adding a chemical additive to the grain based liquid medium processing stream subjected to cavitation, the chemical additive being selected from the group consisting of a de-emulsifier, a polymer and a non-polymer.

6. The method of claim 1, wherein the cavitation is created through the use of at least one high-powered ultrasound transducer operating at a frequency of about 10 to about 30 kHz, optionally at least about 15 kHz.

7. The method of claim 6, wherein at least one said high-powered ultrasound transducer generates between about 100 Watts and about 20,000 kW of power, optionally between about 500 Watts and about 4 kW of power.

8. The method of claim 6, wherein at least one said high-powered ultrasound transducer works at an amplitude of between about 1 and about 150 micrometers, optionally between about 5 and about 24 micrometers, or optionally between about 5 and about 15 micrometers.

9. The method of claim 6, wherein a plurality of said high-powered ultrasound units are used, same being configured in series or in parallel.

10. The method of claim 9, wherein at least one said high-powered ultrasound unit has its own flow cell or the ultrasound unit and flow cell are incorporated together in a length of pipe.

11. The method of claim 1, wherein oil yield is improved by at least 1 percent, optionally at least 20 percent.

12. The method of claim 1, wherein the cavitation is generated by flowing the grain based liquid media through at least one hydrodynamic system reactor unit at a processing pressure suitable for creating a hydrodynamic cavitation zone in the reactor, and wherein the differential processing pressure is in the range of about 15 psi to about 150 psi.

13. The method of claim 12, further including at least two hydrodynamic system reactors in parallel or in series.

14. The method of claim 1, wherein the temperature of the grain based liquid media is maintained between about 60° F. and about 250° F., optionally between about 120° F. and about 212° F., or optionally between about 180° F. and about 212° F.

15. The method of claim 1, wherein the cavitation is created through the use of at least one high-powered ultrasound transducer, and the pressure of the system is maintained between about 1 psig and about 100 psig, optionally between about 5 psig and about 50 psig, or optionally between about 10 psig and about 30 psig.

16. The method of claim 1, wherein the power density is applied to the grain-based liquid medium processing stream in the range of between about 0.8 $W*s/cm^3$ and about 3 $W*s/cm^3$, optionally between about 0.9 $W*s/cm^3$ and about 1.5 $W*s/cm^3$, or optionally between about 0.95 $W*s/cm^3$ and about 1.3 $W*s/cm^3$.

17. The method of claim 1, further including processing the grain based liquid medium subjected to cavitation through a horizontal centrifuge, a disc stack centrifuge, a filter press, or combinations thereof.

18. The method of claim 1, further including adding a chemical additive to a tank hold up prior to or post cavitation treatment, the chemical additive being selected from the group consisting of a de-emulsifier, a polymer and a non-polymer.

19. A method for oil production comprising: applying cavitation to a grain based liquid medium processing stream in one or more locations of an oil separation process at a power and frequency effective to increase oil yield and reduce the residual oil levels in the processed stream when applied prior to, immediately after or both prior to and immediately after the oil separator, wherein the grain in the grain based liquid medium processing stream is selected from corn, rye, sorghum, wheat, barley, oats, rice, or a combination thereof, wherein the cavitation is created through the use of at least one high-powered ultrasound transducer operating at a frequency of about 15 kHz to about 30 kHz, and wherein at least one said high-powered ultrasound transducer generates between about 500 Watts and about 4 kW of power.

20. A system for oil production comprising:
  an oil separation system for grain selected from the group consisting of corn, rye, sorghum, wheat, barley, oats, rice, and combinations thereof, the oil separation system having an grain-based liquid medium processing stream;
  the liquid medium processing stream is selected from the group consisting of whole stillage, thin stillage, inner evaporator effect thin stillage concentrate, concentrated thin stillage syrups, oil from separator, syrup discharge from separator and the mixture of wetcake and syrup prior to the DDGs dryer; and
  a cavitation unit positioned in at least one location along the grain-based liquid medium processing stream of the oil separation system, said cavitation unit operating at a power and frequency effective to increase oil yield and reduce the residual oil levels in the processed stream when applied prior to, immediately after or both prior to and immediately after the oil separator.

* * * * *